United States Patent [19]
Trent et al.

[11] Patent Number: 5,183,004
[45] Date of Patent: Feb. 2, 1993

[54] SELF CONTAINED VIVARIUM

[76] Inventors: Lane Trent, 460 17 Street; Gua-Ming Shau, 151 18 Street, both of Brooklyn, N.Y. 11215

[21] Appl. No.: 762,257

[22] Filed: Sep. 20, 1991

Related U.S. Application Data

[63] Continuation of Ser. No. 545,206, Jun. 28, 1990, abandoned.

[51] Int. Cl.$^5$ ............................................. A01K 63/00
[52] U.S. Cl. ................................................. 119/5
[58] Field of Search .................................. 119/5, 3, 4, 2

[56] References Cited

U.S. PATENT DOCUMENTS

| | | | |
|---|---|---|---|
| 3,141,442 | 7/1964 | Harris | 119/5 |
| 3,324,829 | 6/1967 | Dosamantes | 119/5 |
| 3,699,921 | 10/1972 | Janicek | 119/5 |
| 3,804,064 | 4/1974 | Kuneman et al. | 119/5 |
| 3,855,970 | 12/1974 | Harwood | 119/5 |
| 4,133,024 | 1/1979 | Roehrick | 119/5 |
| 4,176,620 | 12/1979 | Kassos | 119/5 |
| 4,196,695 | 4/1980 | Zupo | 119/5 |
| 4,788,938 | 12/1988 | Davenport | 119/5 |

FOREIGN PATENT DOCUMENTS 2222917  7/1993  Fed. Rep. of Germany .......... 119/5

Primary Examiner—John G. Weiss

[57] ABSTRACT

A self contained vivarium simulating an ecosystem and allowing the interrelation of aquatic, amphibian and terrestrial life. The vivarium is comprised of an aquarium with apertures in the bottom to connect to the aquatic life support equipment below in the cabinet. The aquarium connections and the aquatic life support equipment are conventional and are easily replaceable if malfunction occurs. A gravelized removable landplate is positioned on the inner rim of the aquarium's upper frame. The landplate has an irregular shaped aperture. Aperture edges slope downward into the aquarium forming shallow sections of water and further simulating a lake with a beach. The landplate's sloping aperture edges allow amphibians to rest in shallow areas of water or to climb out onto the landplate. To further enhance aesthetic appeal is a waterfall over the landplate. The landplate is enclosed by a removable enclosure. The vivarium enclosure is atop the aquarium. The vivarium enclosure is comprised of transparent walls and doors connected to a roof at the top and to a frame at the bottom. The vivarium enclosure doors allow access to the landplate and aquarium. The roof has lights to illuminate the vivarium. The cabinet, aquarium, landplate and vivarium enclosure are all separable for easy transporting and reassembly.

8 Claims, 3 Drawing Sheets

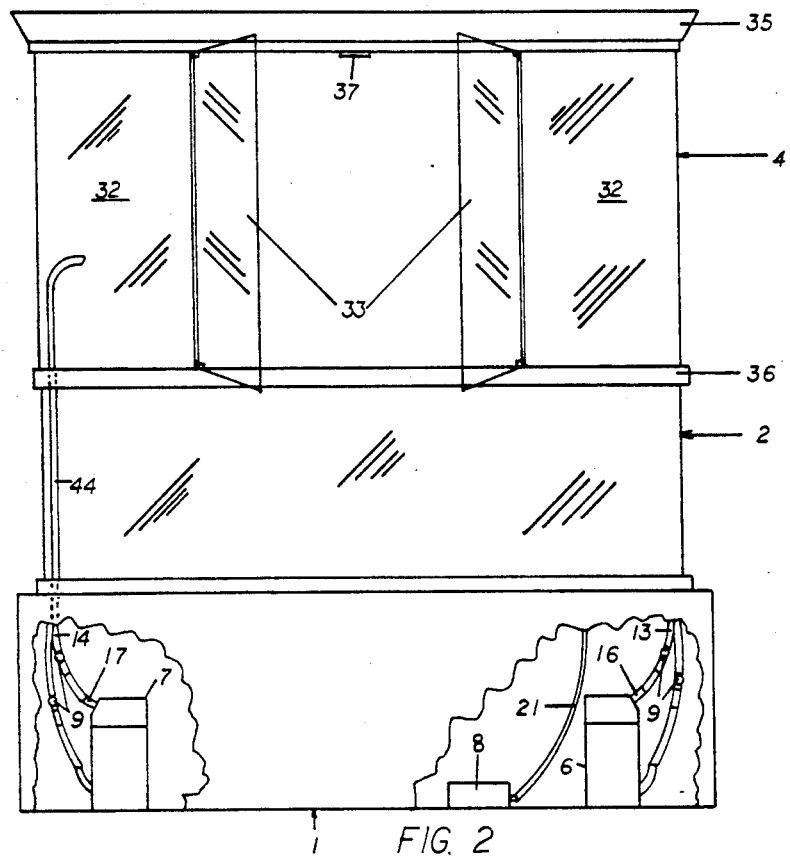
FIG. 2
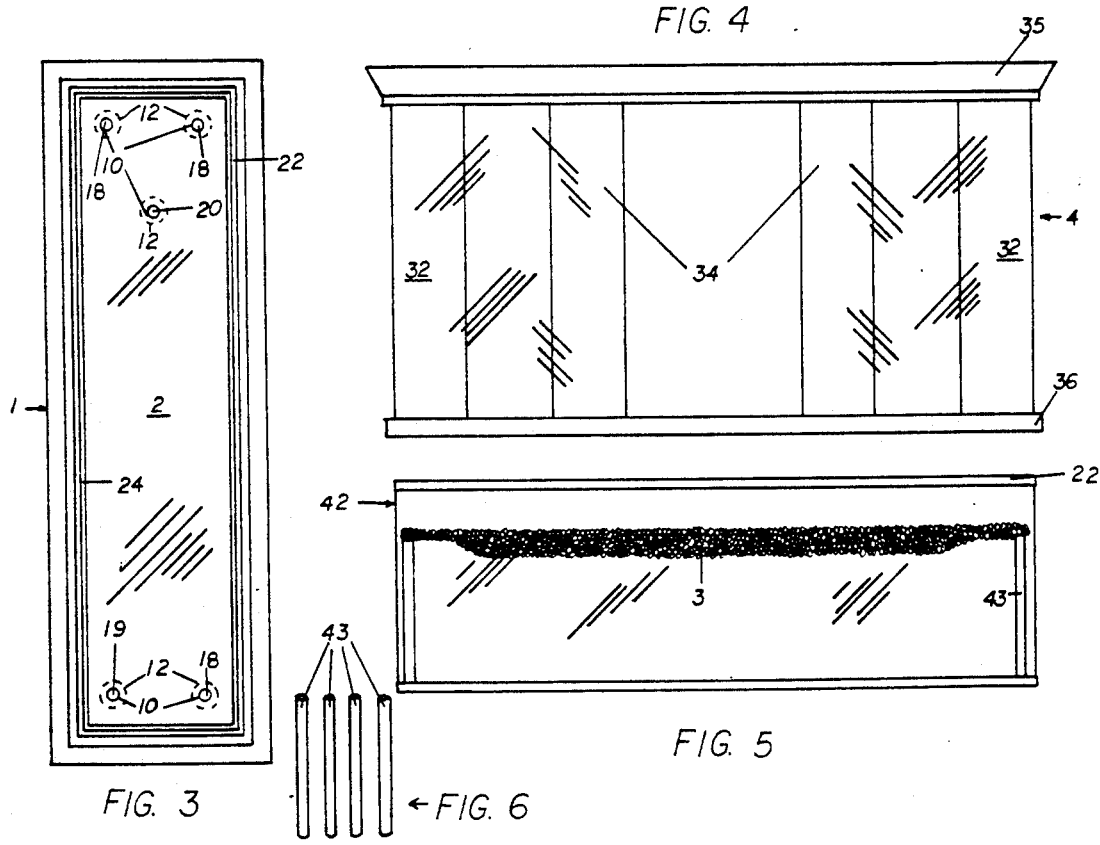
FIG. 3
FIG. 4
FIG. 5
FIG. 6

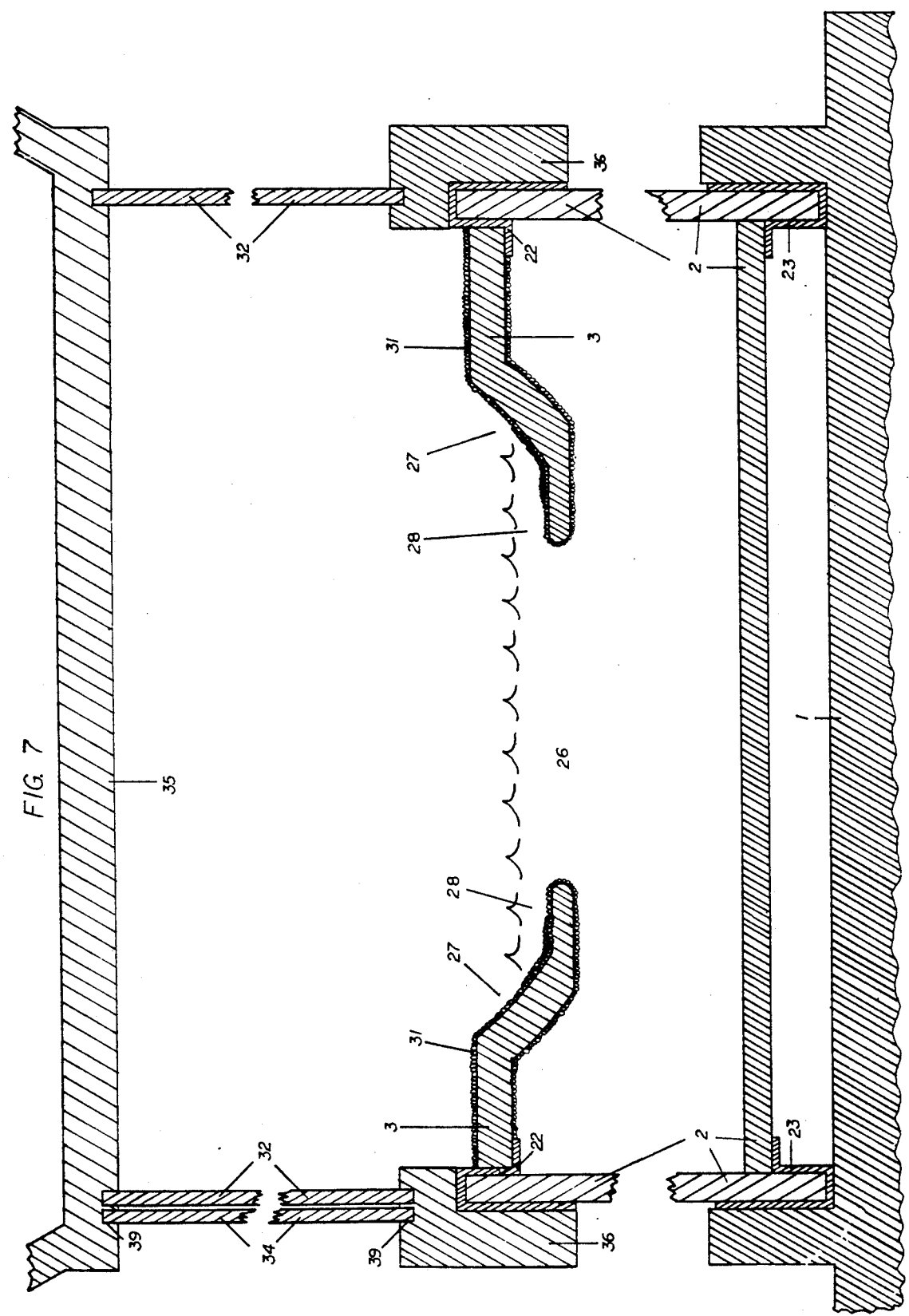

SELF CONTAINED VIVARIUM

This application is a continuation of application Ser. No. 07/545,206, filed Jun. 28, 1990, now abandoned.

BACKGROUND

The present invention relates to a self contained vivarium simulating an ecosystem and allowing the interrelation of aquatic, amphibian and terrestrial life.

The present invention is complete in its scope due to its incorporation of aesthetic appeal, easy maintenance, readily available conventional replacement parts and separable components for easy transporting and reassembly. These features, as well as other features disclosed in the continued specification, render this invention superior to all those prior.

SUMMARY OF INVENTION

A self contained vivarium simulating an ecosystem and allowing the interrelation of aquatic, amphibian and terrestrial life.

The vivarium comprises:

An aquarium with transparent walls and a watertight bottom with apertures for connections. Frames surround and encase the uppermost and lowermost sections of the aquarium walls for support. Apertures in the aquarium bottom have removable watertight connections connected with tubes to the inlets and outlets of the water filter heaters and to the air pump. The water filter heater and air pump are located in the cabinet below which supports the aquarium. All connections and aquatic life support equipment are conventional and are easily replaceable in case of malfunction.

A removable landplate with an aperture is positioned on the inner rim of the upper aquarium frame. The landplate's aperture edges slope downward into the aquarium creating shallow sections of water and simulating a lake beach. The aperture's sloping edges allow amphibians to climb out of the aquarium onto the landplate. The shallow sections of water allow amphibians to rest and still be wet. Fine gravel adhered to the entirety of the landplate further enhances the simulation of a lake beach. Further enhancing aesthetic appeal is a waterfall over the landplate. The water filter heater outlet flows via a tube through the aquarium and landplate to release the water over the landplate in a waterfall effect.

The landplate is enclosed by glass walls and doors which connect to a roof at the top and to a frame at the bottom. Doors provide access to the landplate and aquarium. There are hinged doors on one side of the enclosure and sliding doors on the other side. The sliding doors are usually to the back and allow access when the vivarium is near a wall or other such obstacle. The vivarium enclosure roof has lights to illuminate the vivarium. The roof also has vents to prevent humidity from building up. The vivarium enclosure is removably positioned over the upper aquarium frame. The vivarium components: cabinet, aquarium, landplate and vivarium enclosure are all separable for easy transport and reassembly.

The object of the present invention is to provide a self contained vivarium complete in its scope for long term operation and aesthetically appealing ecosystem simulation.

It is another object of the present invention to place the aquatic life support equipment in the cabinet to be out of sight.

It is another object of the present invention to provide conventional connections with a conventional water filter heater and a conventional air pump for easy replacement in case of malfunction.

It is another object of the present invention to provide a landplate which is positioned on the inner rim of the aquarium upper frame and is removable for easy cleaning and transport.

It is another object of the present invention to provide a landplate with an irregular aperture to simulate a lake.

It is another object of the present invention to provide a landplate with the aperture edges sloping downward into the aquarium creating shallow sections for the amphibians to rest and still be wet.

It is another object of the present invention to provide a landplate with its aperture edges sloping into the aquarium to allow amphibians to climb out onto the landplate.

It is another object of the present invention to provide a landplate with gravel adhered to its entirety to further simulate a lake beach.

It is another object of the present invention to provide a waterfall over the landplate utilizing the water filter heater.

It is another object of the present invention to provide a vivarium enclosure with transparent walls for viewing.

It is another object of the present invention to provide a multiplicity of doors to allow maximum accessability to the landplate and aquarium.

It is another object of the present invention to provide overhead lights to light the landplate and aquarium.

It is another object of the present invention to provide a vivarium enclosure with vents to prevent humidity from building up.

It is another object of the present invention to convert an existing aquarium to a vivarium.

It is another object of the present invention to provide a self contained vivarium which breaks down to separate components such as cabinet, aquarium, landplate and vivarium enclosures.

Other objects of the invention and advantageous features will become apparent in the following DETAILED DESCRIPTION OF THE PREFERRED EMBODIMENTS in conjunction with the accompanying drawings.

BRIEF DESCRIPTION OF THE DRAWINGS

FIG. 2 is a frontal view of a self contained vivarium.

FIG. 3 is the top view of the aquarium over the cabinet with the landplate and the vivarium enclosure removed.

FIG. 4 is the back view of the vivarium enclosure.

FIG. 5 is a frontal view of an existing aquarium with a landplate supported by legs.

FIG. 6 is a perspective view of legs for use with an existing aquarium.

FIG. 7 is a cross sectional side view of the cabinet, aquarium, landplate and vivarium enclosure.

DETAILED DESCRIPTION OF THE PREFERRED EMBODIMENTS

Figure 1:
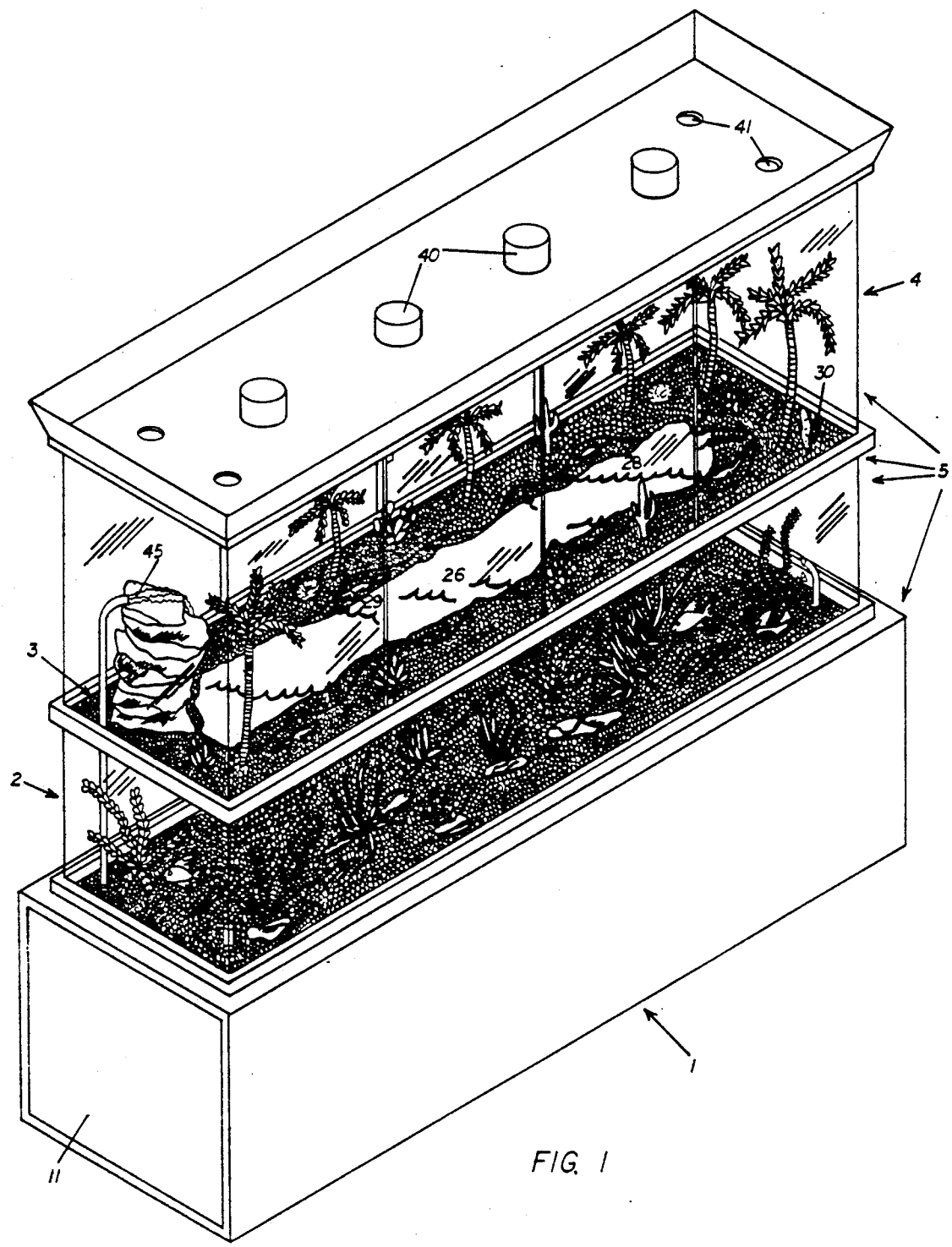
FIG. 1 is a perspective view of the self contained vivarium.

Turning now descriptively to the drawings, in which similar reference characters denote similar elements throughout several views. FIG. 1 illustrates a self contained vivarium 5. The vivarium 5 consists of a cabinet 1 which structurally supports the aquarium 2, the landplate 3, and the vivarium enclosure 4 as shown in FIG. 1.

The cabinet 1 has doors 11 to allow access into the cabinet 1 as shown in FIG. 1. The cabinet 1 also houses the water filter heaters 6 and 7 and air pump 8 as shown in FIG. 2. The top of the cabinet 1 has apertures 12 to allow the connections to the aquarium 2 as shown in FIG. 3.

The aquarium 2 is positioned on the cabinet 1 as shown in FIGS. 1, 2 and 3. The aquarium 2 bottom has apertures 18, 19 and 20 with watertight connections 10 which are connected via tubes 13, 14 and 21 to the water filter heaters 6 and 7 and to the air pump 8 as shown in FIGS. 2 and 3. The tubes 13 and 14 connecting the aquarium 2 to the water filter heaters 6 and 7 have valves 9 which can cut off water flow and allow disconnection of water lines 13 and 14 shown in FIG. 2. The disconnection of these water lines 13 and 14 also allow easy separation of aquarium 2 and cabinet 1. Aquarium frames 22 and 23 surround and encase the uppermost and lowermost sections of the aquarium walls as shown in FIGS. 3 and 7. The upper frame 22 of the aquarium 2 has an inner rim 24 for landplate 3 placement as shown in FIGS. 3 and 7.

The landplate 3 is removably positioned on the inner rim 24 of the upper aquarium frame 22 as shown in FIGS. 1, 3 and 7. The landplate 3 has an irregular aperture 26 with the aperture edges 27 sloping downward into the aquarium 2 forming shallow sections 28 of water shown in FIG. 1. Shallow sections 28 of water allow amphibians 29 to rest and still be wet. Amphibians 30 can also climb the aperture's sloping edges 27 to get out of the aquarium 2 onto the land area as shown in FIG. 1. The landplate 3 has fine gravel adhered to its entirety as shown in FIGS. 1, 5 and 7 to enhance the simulation of a lake beach.

The vivarium enclosure 4 is comprised of walls 32 and doors 33 and 34 connected at the top to a roof 35 and at the bottom to a frame 36 as shown in FIGS. 2, 4 and 7. The vivarium enclosure 4 is removably positioned on the upper aquarium frame 22. The doors 33 have hinges supported by the roof 35 and the bottom frame 36 as shown in FIG. 2. A latch 37 shown in FIG. 2 is attached to the roof 35 keeps the doors closed as well as assisting in opening. Opposite the hinged doors 33 are sliding doors 34 as shown in FIGS. 1 and 4. The sliding doors 34 utilize grooves 39 (shown in FIG. 7) in the roof 35 and the bottom frame 36 to facilitate opening. The doors 33 and 34 allow access to the landplate 3 and the aquarium 2. The roof 35 features lights 40 (shown in FIG. 1) to illuminate the vivarium 2, 3, and 4. The roof 35 also features vents 41 (as shown in FIG. 1) to prevent humidity from building up.

FIG. 7 is the cross sectional side view that exhibits the positioning of the cabinet 1, aquarium 2, landplate and vivarium enclosure as well as their intended separability.

The waterfall effect in FIG. 1 can best be explained in FIG. 2. The water filter heater's 7 outlet 17 is connected with a tube 14 to the aquarium connection 10. An inverted L shaped tube 44 is removably connected to the aquarium connection 10. The L shaped tube 44 goes through the aquarium 2 and the landplate 3 to release its water over the landplate 3.

The conversion of an existing aquarium 42 to a vivarium is shown in FIGS. 4, 5 and 6. An existing aquarium 42 with a landplate 3 supported by removable legs 43 is shown in FIG. 5. The landplate 3 in combination with the vivarium enclosure 4 of FIG. 4 completes the conversion to a vivarium.

While certain novel features of this invention have been shown and described and are further pointed out in the annexed claims, it will be understood that various omissions, substitution and changes in the forms and details of the device illustrated and in its operation, can be made by those skilled in the art without departing from the spirit of the invention.

What is claimed:

1. A self contained ecosystem comprising, a lower cabinet with a top surface and bottom surface, said cabinet including at least one door between the top and bottom surfaces, a lower section vivarium/aquarium with first upper and lower frame members supporting a plurality of transparent walls therebetween, a bottom floor section positioned on a ledge of said lower frame member, said lower frame member positioned above the top surface of said cabinet, said upper frame member having an inner rim extending inwardly towards the middle of the lower section vivarium/aquarium, a rigid landplate is supported on top of said inner rim, said landplate has a dry area and a wet area, said wet area extends downwardly below said inner rim forming a shallow section of water and providing a means of which amphibians can climb out onto the dry landplate area, said vivarium/aquarium also includes an upper section with second upper and lower frame members support a plurality of transparent walls therebetween said second lower frame member is supported on top of the first upper frame member, at least one opening in the upper section's transparent walls to facilitate a door closure means that provides access into said upper section, a roof supported on the second upper frame to enclose the vivarium/aquarium, said roof having apertures for ventilation and lighting.

2. A self contained ecosystem as in claim 1, including water filter heaters and an air pump inside of the cabinet, said cabinet having a plurality of apertures in the top surface to accomodate the passage of tubes from said filter and pump.

3. A self contained ecosystem of claim 2, wherein the bottom floor section has a plurality of apertures with watertight connections for the passage of said tubes.

4. A self contained ecosystem of claim 3, wherein the landplate has an opening therein for passage of said tube to allow water to pass from the tube over the landplate in a waterfall effect.

5. A self contained ecosystem of claim 1, having gravel adhered to the landplate to simulate a beach area.

6. A landplate formed from a rigid material having a dry area and wet area, said landplate has an outer perimeter surrounding said dry area, said dry area extends from the outer perimeter horizontally inward to an edge, said wet area slopes downwardly from said edge to an inner aperture of said landplate said landplate is adapted to be supported in an aquarium to form shallow section of water that provides an area that an amphibian can climb out of the aquarium water to said dry area.

7. A landplate according to claim 6, wherein the landplate has gravel adhered to the landplate's surface to simulate a beach.

8. A landplate according to claim 6, wherein removable support legs extend from a bottom surface of the landplate and are adapted to support the landplate a distance above a floor of an aquarium.

* * * * *